Feb. 27, 1973   J. H. VAN HORN   3,718,929
PULSE CLASSIFICATION SYSTEM
Filed June 8, 1966   2 Sheets-Sheet 1

INVENTOR.
JAMES H. VANHORN
BY Raymond L. Owens
ATTORNEY

INVENTOR.
JAMES H. VANHORN
BY Raymond L. Owens
ATTORNEY

United States Patent Office 3,718,929
Patented Feb. 27, 1973

3,718,929
PULSE CLASSIFICATION SYSTEM
James H. Van Horn, Pittsford, N.Y., assignor to
General Dynamics Corporation
Filed June 8, 1966, Ser. No. 556,093
Int. Cl. G01s 7/28
U.S. Cl. 343—17.2 R                                    7 Claims

ABSTRACT OF THE DISCLOSURE

A pulse classification system is described which in one embodiment includes a signal generator which is adapted to produce a reference signal having a predetermined frequency spectrum, with said reference signal being produced in timed relation with a received pulse signal, and means for comparing corresponding predetermined bandwidth portions of the pulse and reference signals to determine whether or not their energy levels correspond.

Figure 1:
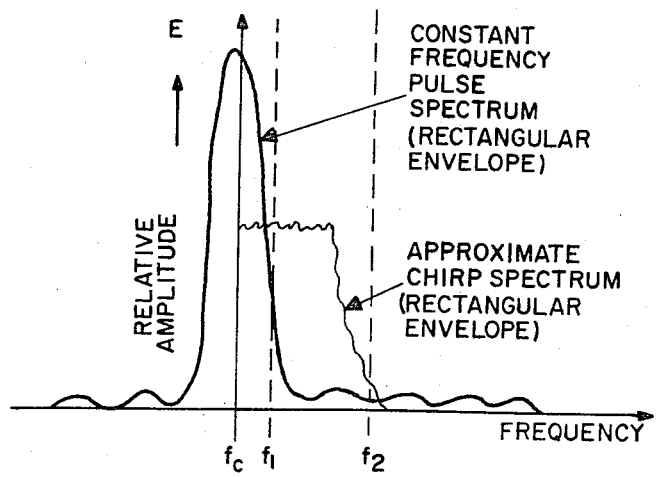

The present invention relates to pulse signal classification systems, and more particularly to systems which classify pulses in accordance with their frequency spectrum.

The present invention finds application in communication systems, control systems, radar systems, signal analysis systems, and other apparatus responsive to pulse type signals. Various types of systems today are employing pulse compression schemes which will be defined as those arrangements which vary the phase, modulation frequency, and other time relations of a carrier frequency pulse. Compression type pulses generally have the advantageous property of producing broad distributions of energy in the frequency domain while at the same time permitting the transmission of long pulses or pulse trains at low peak power. An example of such a system is a chirp radar system wherein the pulses are modulated in frequency. It is extremely important in pulse compression radar systems to determine if a received or echo signal has the same frequency modulation as the signal which has been generated by the radar system, or conversely, to determine if the received signal was generated by some other source, say for example, some countermeasure device (viz, a jammer or decoy).

In view of the foregoing, it is an object of the present invention to provide an improved system for pulse classification.

It is another object of the invention to provide an improved system for classifying pulses according to their frequency spectrum.

A still further object of the present invention is to provide an improved pulse classification system which is sensitive to deviations in the energy spectrum of a radar return from its desired or a predetermined spectrum.

In accordance with one exemplary embodiment of the present invention, there is provided a pulse classification system comprising signal generator means which is responsive to a received pulse and is adapted to generate a reference signal of a predetermined carrier frequency with the same envelope configuration as the received pulse and having a predetermined frequency spectrum, a first bandpass filter adapted to pass signals within a predetermined bandwidth from the received pulse signal, and a second bandpass filter adapted to pass the same predetermined bandwidth from the generated reference signal. The system also includes means for comparing the outputs of each of the bandpass filters to determine whether or not the energy levels of these two signals substantially correspond.

When the above embodiment is used in a compression radar system such as a chirp radar system, by comparing the energy level of the same frequency bandwidth of the received signal against that of the reference signal, it can readily be determined if their frequency spectrums are different indicating whether or not the received pulse signal was propagated by the chirp radar system.

In still another exemplary embodiment according to the invention there is provided a system which determines the signal base of a received pulse which may be used as a basis for signal classification. The signal base may be defined as the bandwidth of a received signal pulse, which bandwidth lies within a predetermined frequency spectrum multiplied by the duration of the received signal pulse. The system includes a plurality of filter circuits, each circuit being adapted to pass a discrete portion of the received pulse within the predetermined frequency spectrum and also to determine if each passed portion is above a predetermined amplitude level. A summing amplifier adds all the received pulse portions and produces an output signal representative of the bandwidth of the received pulse within the predetermined frequency spectrum. Means are then provided to multiply the output signal from the summing amplifier by a signal representative of the received pulse duration to obtain the signal base. The latter described embodiment is particularly useful in passive type detection systems. Inasmuch as the signal base of a received radar return pulse is a measure of the nature of the radar system which generated that pulse, the correlation of the signal base with certain known bases is an indication of the "threat level" of the device from which the radar return emanates (viz, an approaching missile equipped with a radar homing device). Accordingly, correlation means may be associated with the system which determines the signal base.

Figure 2:
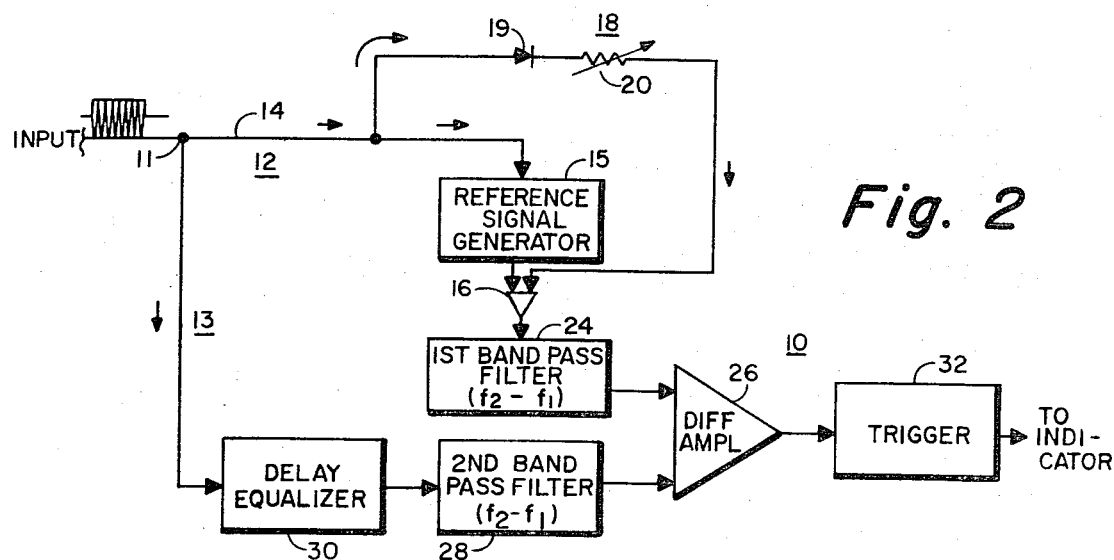
Figure 3:
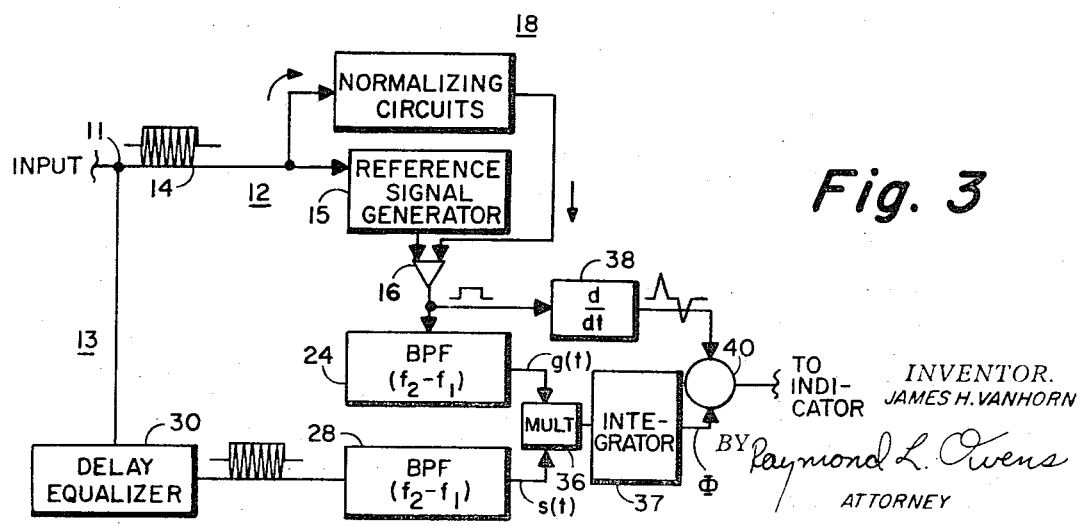
Figure 4:
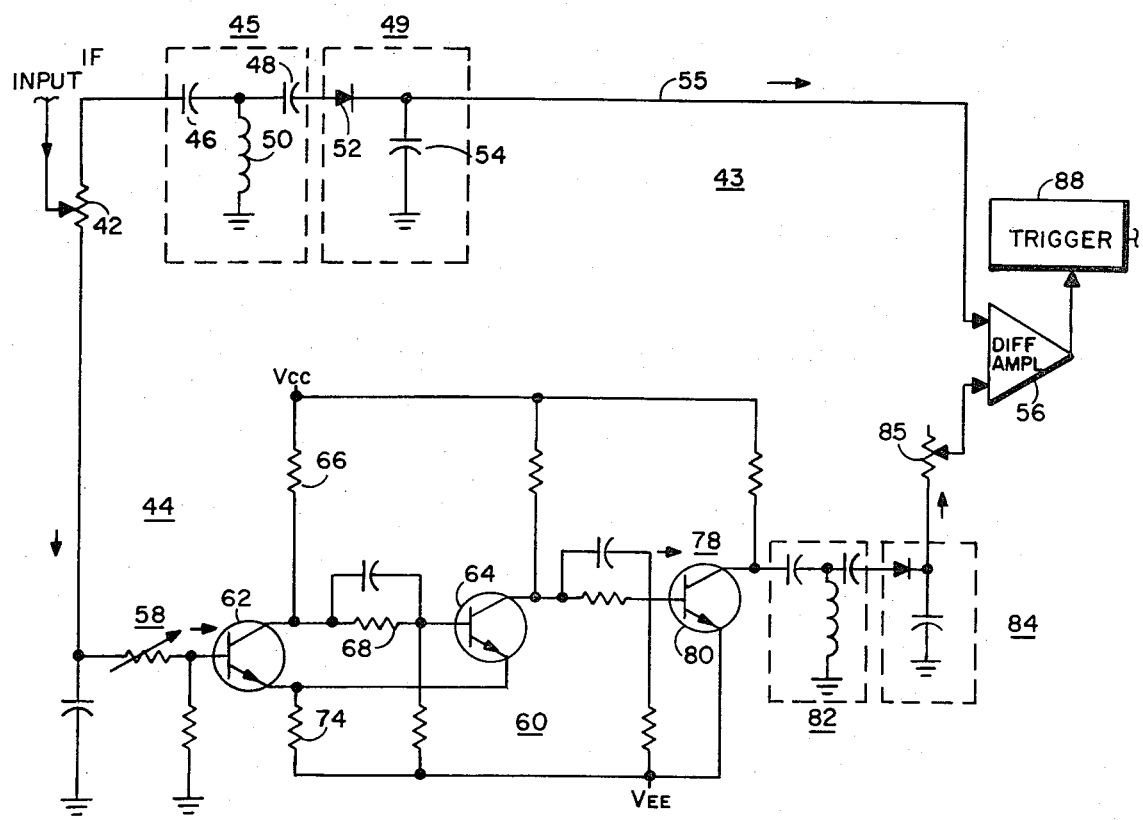
Figure 5:
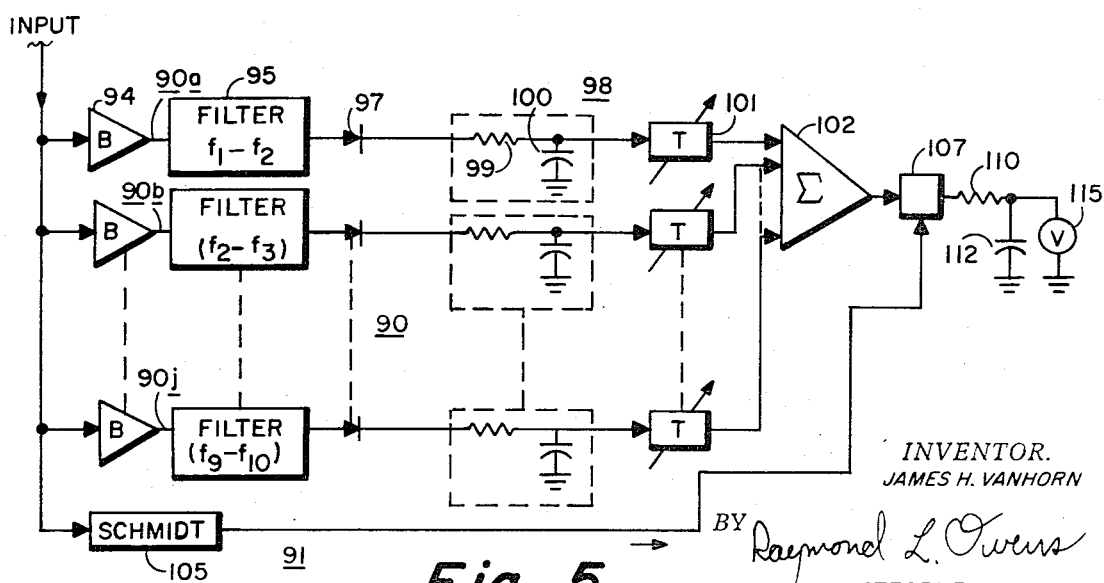

The invention itself, both as to its organization and method of operation, as well as additional objects and advantages thereof will become more readily apparent from a reading of the following description in connection with the accompanying drawings in which:

FIG. 1 is a graph showing the spectra of a chirp pulse and a pulse of constant frequency, both pulses having the same rectangular envelope configuration, as well as energy content, FIG. 2 is a block diagram of an exemplary system for pulse signal classification in accordance with the present invention, FIG. 3 is a block diagram of another embodiment of a pulse classification system in accordance with the invention, FIG. 4 is a diagram in block and schematic form of a pulse classification system in accordance with the invention, and FIG. 5 is still another diagram, in block and schematic form of an exemplary pulse classification system in accordance with the present invention for obtaining the signal base of a received pulse, i.e., a signal which is indicative of the product of a determined bandwith of a received pulse and the duration of the received pulse signal.

Referring first to FIG. 1, there are shown normalized amplitude versus frequency curves of two different pulse signals, both of which describe the same envelope configuration and contain the same energy. More particularly, the signals are related inasmuch as both have envelopes of the same rectangular or pulse configuration, with one pulse having a fixed carrier frequency $f_c$ whereas the other, a chirp signal, has a varying frequency which is obtained by frequency modulating the carrier frequency $f_c$. By comparison of the spectrum of the two signals, it is clear from FIG. 1 that the chirp frequency produces a broad distribution of energy in the frequency domain, whereas the pulse of a fixed frequency, arbitrarily considering only the pulse frequency spectrum to the right of the reference frequency line $f_c$ has most of its energy in the bandwidth indicated from $f_c$ to $f_1$.

First, a brief general discussion of the invention having reference to FIG. 1 and the exemplary system of FIG. 2 will be set forth. If it is desired to determine if a return pulse of a radar system is the chirp pulse having the frequency spectrum as shown, then in response to a received pulse, the system generates a pulse of fixed frequency $f_c$ having the same general envelope and energy content as the received pulse. The system may also include two bandpass filters for passing the same frequency bandwidth $(f_1-f_2)$ from each signal and means for comparing the energy level of the bandwidth $(f_1-f_2)$ of the received pulse against the energy level of the same bandwidth $(f_1-f_2)$ of the reference signal to make a determination as to whether or not the frequency spectrums of the two pulses correspond or just as to how they differ.

At the outset, it should be understood that other pulses of a compression variety which have phase or frequency modulation, and other time modulation with respect to some carrier pulse frequency $f_c$ will also be applicable for use with the present invention. Moreover, the reference pulse signal itself may also have a variable frequency time relation but its frequency spectrum is desirably known.

Turning now to a detailed consideration of FIG. 2, there is shown one representative system 10 which embodies the present invention. The system 10 receives a pulse to be analyzed at a junction 11 and delivers the pulse in two separate designated circuit paths or channels, 12 and 13 respectively. The received pulse signal may be, for example, an R-F frequency delivered directly from an antenna or a converted intermediate IF. In the first path 12, the received pulse is delivered by a lead 14 to a reference signal generator 15 which includes conventional circuitry for generating a reference carrier frequency $f_c$ and is adapted to provide it as an output to a variable gain buffer amplifier 16. Simultaneously, the received pulse is delivered to a normalizing circuit 18, shown as a diode 19 in series with a variable resistor 20, which delivers a gain controlling voltage to the buffer amplifier 16. The normalizing circuit 18, reference signal generator 15, and the buffer amplifier 16 provide a reference signal or output pulse of a frequency having the same envelope configuration and energy content as the received pulse. The generated reference signal is delivered to a first bandpass filter 24 which passes the bandwidth $(f_2-f_1)$ from the frequency spectrum of the pulse and delivers it to a difference amplifier 26.

Alternatively, the received pulse may be delivered to a diode which couples the positive portion of the reference signal to a Schmitt trigger circuit adapted to provide an enabling pulse to a switching gate. When enabled, the switching gate permits a local oscillator to deliver a signal of fixed frequency $f_c$ to the difference amplifier 26 for the duration that the Schmitt trigger circuit is actuated by the received pulse.

The difference amplifier 26 also receives the output of a bandpass filter 28, positioned in the circuit path 13 and which filters the frequency spectrum $(f_2-f_1)$ from the received pulse. As shown, a delay equalizing circuit 30 is provided before the bandpass filter 24 and is arranged to delay the received pulse for a period of time which compensates for the inherent delays in the elements in the channel 12 in producing its input signal to the difference amplifier 26. Therefore, the difference amplifier 26 will receive input signals from both bandpass filters 24 and 28 which exactly correspond in timed relation with each other. If the output signal from the difference amplifier 26 is above a predetermined energy level, indicated by an output voltage of the amplifier 26, then a trigger circuit 32 will be actuated.

One application of the circuit of FIG. 2 would be to provide the output of the trigger circuit 32 as an input to an enabling circuit in the indicator section of a radar or reconnaissance system which would signal the indicator whether or not to display the received signal pulse on its output device.

FIG. 3 shows a second method of comparison of the reference signal against the received pulse utilizing the principle of cross correlation. This principle in an elementary (non-rigorous) form is to the effect that things very much alike correlate to greater values than things very dissimilar. The system shown in FIG. 3 applies this principle to the present invention by performing the following integration:

$$\Phi = \int_{-\infty}^{\infty} s(t) g(t) \, dt \qquad (1)$$

wherein $s(t)$ is the received input signal after filtering,
$g(t)$ is the reference generated signal after filtering, and
$\Phi$ corresponds to the integral of the product of the two signals Before considering in detail the system shown in FIG. 3, it will be noted that many of the circuit elements in this figure correspond with those in FIG. 2, and for this reason, the same reference numerals will be used where circuit elements do perform similar functions. The output of both bandpass filters 24 and 28, $g(t)$ and $s(t)$ respectively, are each directed to a circuit 36, which produces a signal indicative of the product of the output signals from the filters 24 and 28. The circuit 36 may be a mixer, such as a balanced modulator. The combined signal is then directed to a circuit 37 which may be an integrator circuit (viz, an RC circuit with amplification), which integrates it and produces an output signal which corresponds to that of Equation 1. In accordance with the above explained cross correlation theory, if the two input signals to the circuit 37 substantially correspond, the output of the correlator 37 will be a relatively high level, whereas if they are substantially different, it will be a low level. The output of the correlator 37 may be arranged to actuate a trigger device.

In order to insure proper timing, a differentiator circuit 38 is responsive to the output of the reference signal generator 15 and opens and closes a gate 40 at the proper instant in time. The gate 40 opens and passes the output of the correlator 37 to the indicator when actuated by the positive leading spike pulse of the differentiator 38 and closes when actuated by the trailing negative pulse produced by the differentiator 38. Thus, the gate 40 may include a flip-flop as one input to an AND gate; the AND gate being enabled and inhibited when the flip-flop is set and reset in response to the positive and negative differentiator 38 output pulses respectively.

Another circuit using the cross correlation theory is shown in FIG. 4. In this arrangement, the integration is accomplished by parts. The incoming received pulse signal, which may for example, have an envelope of substantially square wave configuration, is directed in two paths or channels 43 and 44, by means of a balancing potentiometer 42. In the path 43, it first encounters a high pass filter circuit 45 including two series capacitors 46 and 48 and a shunt inductor 50 which permits the bandwidth above $f_1$ to pass thereby, while blocking the low frequency components of the pulse signal (viz, below the frequency $f_1$). The filtered signal then encounters a rectifying and integrating network 49 including a diode 52 which passes only the positive polarity portion of the filtered signal. The resistance of the diode 52 in combination with a shunt capacitor 54 provides an integrating function, and the integrated output signal is delivered by a lead 55 to a difference amplifier 56.

In the second circuit path 44, the received pulse first encounters a network 58 which is provided as an input circuit to a Schmitt trigger 60. The role of the network 58 is to adjust the pulse duration by varying input voltage to the Schmitt trigger circuit 60 caused by a received pulse of a given amplitude. In this embodiment, of course, the received pulse duration will be the persistence period of the received pulse above the Schmitt trigger threshold amplitude.

The Schmitt trigger 60 is shown as including two NPN transistors 62 and 64, with the transistor 62 being normally cut off. When cut off, the collector voltage of the transistor 62 is substantially equal to the operating voltage $V_{cc}$ which may suitably be twelve volts positive. The $V_{cc}$ is also applied to the base of the transistor 64 through voltage dividing resistors 66 and 68.

When a positive-going signal of greater than threshold amplitude is provided by the input network 58 to the base of the cutoff transistor 62, the transistor 62 begins to conduct. The collector of the transistor 62 is, as noted, coupled directly to the base of the transistor 64. As the transistor 62 begins to conduct, the potential at its collector decreases, becoming less positive. This decreasing potential is applied to the base of the transistor 64, and causes the emitter current of the transistor 64 to decrease, lowering the potential drop across a resistor 74. This action progressively continues until the transistor 62 operates in the saturated region and the transistor 64 is cut off. The new stable condition continues until the input signal to the transistor 62 begins to fall below the threshold amplitude. This condition reduces current flow through the transistor 62. At the same time, the collector voltage of the transistor 62 increases, causing the transistor 64 to saturate. The output of the Schmitt trigger 60 is taken directly from the collector of the transistor 64 and has a square wave shape.

Moreover, the output of the Schmitt trigger 60 is provided as an input to an amplifier circuit 78, including a transistor 80, the output being applied to the base of the transistor 80. In turn, the amplifier circuit 78 delivers an amplified output square wave to a bandpass filter network 82 which is serially connected to a rectifying and integrating network 84. Both networks 82 and 84 are identical in construction with their respective counterparts, the filter network 45 and the rectifying and integrating network 49, previously described in the first circuit path 43. The output of the integrating network 84 is delivered to the difference amplifier 56 by way of a voltage level adjusting potentiometer 85.

The frequency spectrum of the square wave developed by the Schmitt trigger depends upon the period of the generated square wave and its amplitude. The difference amplifier 56 compares the relative energy content, represented by the input voltages and, if they are substantially different, the output of the difference amplifier will be of a sufficient level to actuate a trigger circuit 88, indicating that the received pulse has a frequency spectrum greater than that of the reference pulse generated by the Schmitt trigger 60.

The signal base, which was defined as the product of the bandwidth of a received pulse having a predetermined spectrum multiplied by the received pulse duration, is a significant quantity which may be used in classifying received pulses. It may find application in such equipment as radar, communications, countermeasures, reconnaissance, radar astronomy, spectroscopy, and other signal identification systems. A representative system is shown in FIG. 5. The system is specifically arranged to direct a received pulse into two different paths 90 and 91.

In path 90, the received pulse signal is delivered as an input to a plurality of equal bandpass intervals or equally weighted bandpass channels 90. In the illustrated version, there are ten such channels, 90a to 90j. Only the channel 90a need be described, inasmuch as the others operate in the same manner. The received pulse is first delivered to a buffer amplifier 94, which in turn has its output coupled to a bandpass filter 95, adapted to filter one-tenth of a particular frequency spectrum under consideration (viz, from frequencies $f_1$ to $f_{10}$). The output signal from the filter 95 is then rectified by a diode 97 and integrated by means of an integrator 98 comprising a resistor 99 and a shunt capacitor 100.

If the voltage output from the integrator 98 is above a predetermined level, a threshold gate 101 (e.g. a Schmitt trigger) will provide an output signal of a fixed voltage level. On the other hand, if the input signal to the threshold gate 101 is below the predetermined level, the gate 101 will not produce an output as this portion of the predetermined bandwidth will have been indicated to have been derived from some extraneous source. The output of each of the threshold gate circuits is applied to a summing circuit 102. The summing circuit 102 adds all the voltages from the ten threshold circuits 90 and produces an output signal, the voltage level of which is proportional to the bandwidth of the received signal within the predetermined frequency spectrum and having at least a predetermined relative amplitude-frequency curve.

In the circuit path 91, the received signal is delivered to a Schmitt trigger circuit 105 which yields a pulse output, the duration of which is equal to the input duration of the received pulse. The Schmitt trigger output is adapted to enable a gate 107 coupled to the output of the summing circuit 101. Thus, the summing circuit will provide an output which passes through the gate 107 only during the duration of time that a received pulse is present. The output of the gate 107 is connected in series to a resistor 110 and a capacitor 112 which perform an integrating function. More particularly, the charge on the capacitor 112 is proportional to the signal base (i.e. the time bandwidth product), which may of course be measured by means of a voltage sensing device, shown as a voltmeter 115, or used to control an indicating device.

A specific example in the operation of the illustrated system will be set forth. Assuming that the received pulse to be analyzed is the chirp pulse, shown in FIG. 1, and that the bandpass under investigation is from $(f_1-f_2)$ with each of the filters 95(a–j) filtering a successive tenth of the entire bandpass $(f_1-f_2)$. Moreover, it will be assumed that each threshold circuit 101 provides an output signal which is either one volt or zero volt. When a threshold circuit 101 provides a one volt output, it indicates that the portion of the frequency spectrum $(f_1-f_2)$ filtered by its associated filter 95 is at least the predetermined amplitude level, shown in FIG. 1. The output of the summing amplifier 102, if all of the triggers 101 provide an input to it, is ten volts, and this quantity is applied across the resistor 110 and capacitor 112 combination for the pulse duration.

The signal base of different bandwidth compression type pulses other than that of FIG. 1 may, of course, be determined with the embodiment of FIG. 5. In such an instance, the threshold gates 101 in each of the circuits may have a different threshold for actuation so as to tailor the output of the amplifier 102 in accordance with the relative amplitude-frequency curves of the compression pulse under investigation. Moreover, the bandpass of each of the filters need not be equally weighted relative amplitude-frequency, again depending upon the particular pulse spectrum curve to be analyzed.

While specific embodiments of the invention have been described and shown, they should be considered only to be illustrative, as still further modifications will undoubtably occur to those skilled in the art. For example, while a particular frequency band $(f_1-f_2)$ has been chosen so that the energy level in this band of the received pulse is greater than the reference signal energy level in the same band, other comparison arrangements could be used whereby, for instance, the energy level of the reference band will be greater than that of the received signal. Therefore, the foregoing descriptions are to be considered as illustrative and not in any limiting sense.

What is claimed is:

1. A pulse classification system comprising
(a) first bandpass filter means for transmitting a portion containing a predetermined bandwidth of the frequency spectrum of a received pulse signal having an unknown frequency spectrum, (b) signal generator means responsive to said received pulse for generating, in time relation with said received pulse, a reference signal having a predetermined frequency spectrum, (c) second bandpass filter means responsive to said reference signal transmitting a portion of said signal of said predetermined bandwidth, and (d) comparison means for comparing the outputs from said first and second bandpass filter means for deriving an output manifesting the correspondence between said received and reference pulses.

2. The invention as defined in claim 1 wherein said comparison means includes a difference amplifier coupled to said first and second bandpass filter means and a trigger circuit actuated by said difference amplifier when a predetermined signal level is developed by said difference amplifier.

3. The invention as defined in claim 1 wherein said signal generator means includes normalizing circuit means for conforming the envelope configuration of said reference signal to the envelope configuration of said received pulse signal.

4. The invention as defined in claim 3 wherein said comparison means includes means for multiplying output signals of said first and second bandpass filter means, means for integrating the output of said summing means, and means responsive to the output of said integrating means for generating a signal indicating whether or not said received pulses and said reference signals have substantially the same frequency spectrum.

5. The invention as defined in claim 1 where said first and second bandpass means each include means for integrating the transmitted portion of its associated signal and applying said portion as an input to said comparison means.

6. The invention as defined in claim 5 wherein said comparison means comprises a difference amplifier and a trigger circuit responsive to said output of said difference amplifier for generating an output signal when the output of said difference amplifier reaches a predetermined voltage level indicating that the frequency spectrum of said signals do not substantially correspond.

7. A system for determining the signal base of a received pulse by multiplying its bandwidth lying within a predetermined frequency spectrum by the duration of the pulse comprising (a) a plurality of filter channels, each responsive to successive discrete portions of said predetermined frequency spectrum of said received pulse, and including threshold means for providing a signal when said spectrum portion to which it is responsive has at least a predetermined energy level, (b) summing means responsive to inputs from each said channels for producing an output representative of the bandwidth of the received pulse within said predetermined frequency spectrum, (c) timing circuit means also responsive to said received pulse adapted to derive an output corresponding to the duration of the received pulse, and (d) output means including gating means responsive to said timing circuit means for obtaining the product of said summing means and said timing means outputs to derive a signal representative of the signal base of the received pulse.

References Cited

UNITED STATES PATENTS 3,299,427   1/1967   Teruo Kondo ___ 343—17.2 PC

THEODORE H. TUBBESING, Primary Examiner

U.S. Cl. X.R.
343—5 SA; 328—110, 149